| (12) | United States Patent | (10) Patent No.: | US 7,578,984 B2 |
|---|---|---|---|
| | Maitland | (45) Date of Patent: | Aug. 25, 2009 |

(54) REGENERATION OF CAUSTIC SOLUTIONS

(75) Inventor: Charles F. Maitland, Sugarland, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 716 days.

(21) Appl. No.: 10/478,702

(22) PCT Filed: Feb. 22, 2002

(86) PCT No.: PCT/US02/05630

§ 371 (c)(1),
(2), (4) Date: Apr. 26, 2004

(87) PCT Pub. No.: WO03/072224

PCT Pub. Date: Sep. 4, 2003

(65) Prior Publication Data

US 2004/0170543 A1    Sep. 2, 2004

(51) Int. Cl.
*C01D 3/06* (2006.01)
*B01J 38/64* (2006.01)
*C10G 19/08* (2006.01)
*C10G 29/20* (2006.01)
*B01J 10/00* (2006.01)

(52) U.S. Cl. .......... 423/183; 423/182; 502/25; 208/235; 422/129

(58) Field of Classification Search ......... 422/242; 423/182, 183, 642; 208/235; 502/25
See application file for complete search history.

(56) References Cited

U.S. PATENT DOCUMENTS

| 2,425,414 | A | * | 8/1947 | Bond | ............... | 423/183 |
| 2,859,177 | A | * | 11/1958 | Rippie et al. | ............... | 208/235 |
| 4,080,287 | A | * | 3/1978 | Conway et al. | ............... | 210/604 |
| 4,684,703 | A | * | 8/1987 | Wagner et al. | ............... | 526/88 |
| 6,387,348 | B1 | * | 5/2002 | Ferrell et al. | ............... | 423/642 |

* cited by examiner

*Primary Examiner*—Alexa D Neckel
*Assistant Examiner*—Matthew J Merkling
(74) *Attorney, Agent, or Firm*—Fish & Associates, PC

(57) ABSTRACT

A caustic recovery system comprising an oxygen source adapted to provide a gas stream comprising at least 30% oxygen. A method of regenerating caustic comprising intermingling spent caustic with a gas stream comprising at least 30% oxygen.

7 Claims, 2 Drawing Sheets

REGENERATION OF CAUSTIC SOLUTIONS

FIELD OF THE INVENTION

The field of the invention is caustic solution regeneration.

BACKGROUND OF THE INVENTION

Current caustic solution regeneration systems often use air as a supply of oxygen with oxygen and water being used to convert mercaptides to disulfide oil and regenerated caustic. Referring to prior art FIG. 1, air B1 from air source 20 (typically just the atmosphere around the plant in which regeneration is being done) is compressed by compressor 22 and regulated by valve 23, and then fed as input stream B into oxidizer tower 40 which is typically a co-current flow tower (A plant may utilize a second source of air 21 to provide air B2 to replace or supplement air B1). Spent caustic A1 from caustic source 10 is also fed via heat exchanger 15 as input stream A into oxidizer tower 40, generally with catalyst A2 from catalyst source 11 mixed in while caustic A1 passes through mixing device 13. In oxidizer tower 40, the air B and caustic A are contacted for oxidation, and regenerated caustic C is transported via pump 24 for reuse in the treating process unit 25. The regeneration reaction only uses the oxygen portion of the air supplied to the tower. As such, the unused gasses contained in the air are a waste product of the reaction and are vented from the tower as a stream D of mixed gas and hydrocarbons, with oxygen and nitrogen being large components of the vented stream D. In some instances, natural gas from gas source 30 is also fed into oxidizer tower 40 or into downstream piping in order to minimize the risk of explosion posed by the vented stream D.

After being vented from oxidizer tower 40, the vent stream D of gas and hydrocarbons will often be scrubbed in a caustic scrubbing system to minimize entrained oils prior to disposal. In FIG. 1, the stream is fed into off gas absorber ("OGA") 50. In OGA 50, the vented waste D from tower 40 is contacted with fresh caustic I from source 12. From OGA 50, caustic A3 is pumped by pump 14 back into input stream A, and the "scrubbed" nitrogen, oxygen, and other gasses E are fed into KO drum 60 prior to disposal to the atmosphere 90 via a downstream combustion device 70 Liquids collected in the KO drum 60, are returned to the caustic system.

The air for the oxidizer is generally supplied by an air compressor 22 or from a plant air system. Designs of this type use greater than the stochiometric oxygen requirements thereby increasing air supply and purge requirements.

Depending on the concentrations of the spent caustic material, variations to FIG. 1 include methods to cool the recycle stream A3 via heat exchange with the feed stream A1 and cooling water to moderate the overall temperature in the oxidizer 40 as the caustic regeneration is an exothermic reaction.

SUMMARY OF THE INVENTION

The present invention is directed to the use of pure oxygen in place of air during caustic recovery. The use of pure oxygen instead of air eliminates the need for treatment and disposal of waste gasses as is required in current caustic recover systems. More particularly, disclosed is a caustic recovery system comprising an oxygen source adapted to provide a gas stream comprising at least 50% oxygen, as is a method of regenerating caustic comprising intermingling spent caustic with a gas stream comprising at least 50% oxygen.

It is contemplated that elimination of the need of utility consumption (electricity, steam or diesel) for air compression and the elimination of capital equipment for air compression and the disposal of waste gasses will adequately compensate for the increased expense associated with providing pure oxygen. It is also contemplated that the benefit of using pure oxygen will be sufficient to overcome the reluctance of using pure oxygen in a volatile environment considering the hazards and environmental concerns for processing the waste gasses in the current art.

Various objects, features, aspects and advantages of the present invention will become more apparent from the following detailed description of preferred embodiments of the invention, along with the accompanying drawings in which like numerals represent like components.

DETAILED DESCRIPTION

Figure 2:
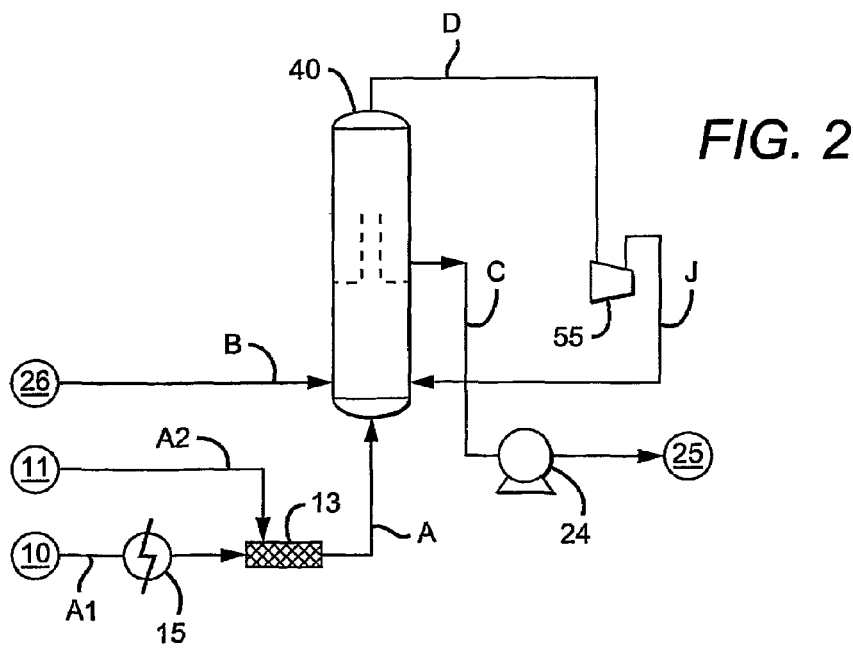
FIG. 2 is a schematic view of a first caustic recovery system embodying the invention.

In FIG. 2, a caustic recovery system comprises an oxygen source 26, a caustic solution source 10, and a catalyst source 11. Caustic A (mixed with catalyst A2) and oxygen B are fed into oxidizer tower 40 In oxidizer tower 40, the oxygen B and caustic A are contacted for oxidation, and regenerated caustic C is transported via pump 24 for reuse in the treating process unit 24. Any unused oxygen D is compressed and fed back into tower 40 as oxygen input J.

The basic reaction for caustic recovery takes place in the presence of catalyst A2 introduced into the system. The formula which describes the basic reaction is:

$$4RSNa + O_2 + 4H_2O = 2RSSR + 4NaOH + 2H_2O.$$

In addition, when H2S has been present in the hydrocarbon process stream that has been contacted with the caustic solution, sodium sulfide is formed and can be partially regenerated in the oxidizer via the following reaction:

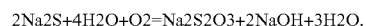
$$2Na_2S + 4H_2O + O_2 = Na_2S_2O_3 + 2NaOH + 3H_2O.$$

Figure 1:
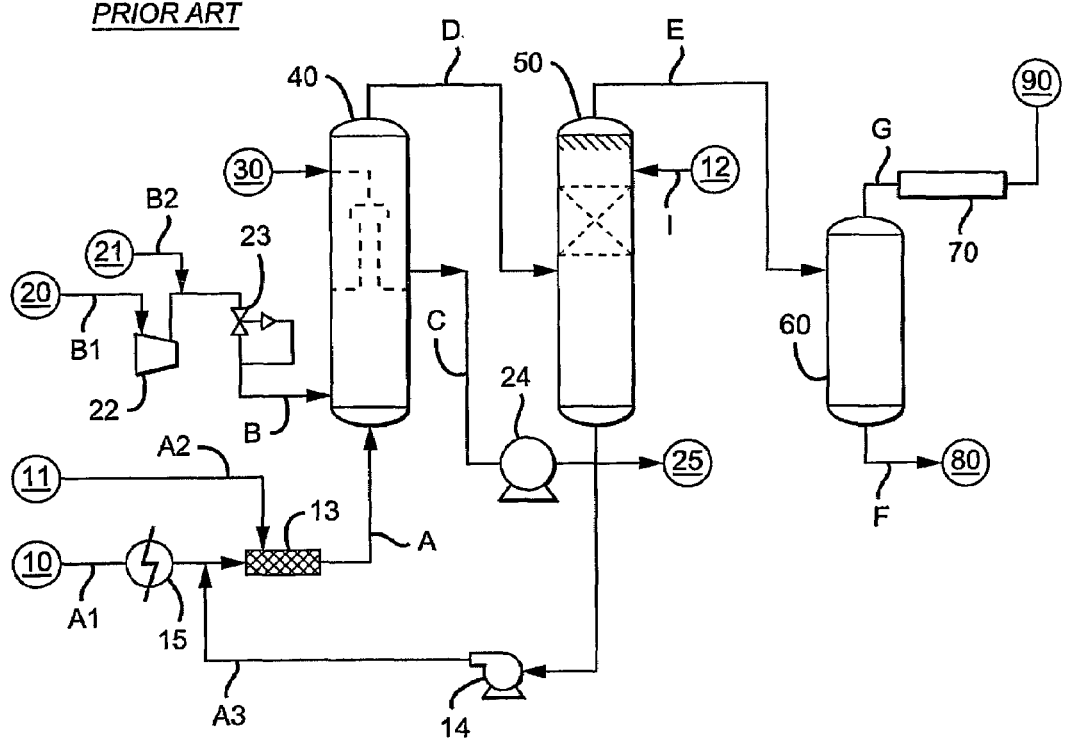
FIG. 1 is a schematic view of a prior art caustic recovery system.

The primary difference between the method used by the system of FIG. 2 and that of FIG. 1 is that pure (at least relatively) oxygen is used in place of air. Since the oxygen source is free from the unnecessary gasses present in air, the need to handle unused gasses is eliminated.

Figure 3:
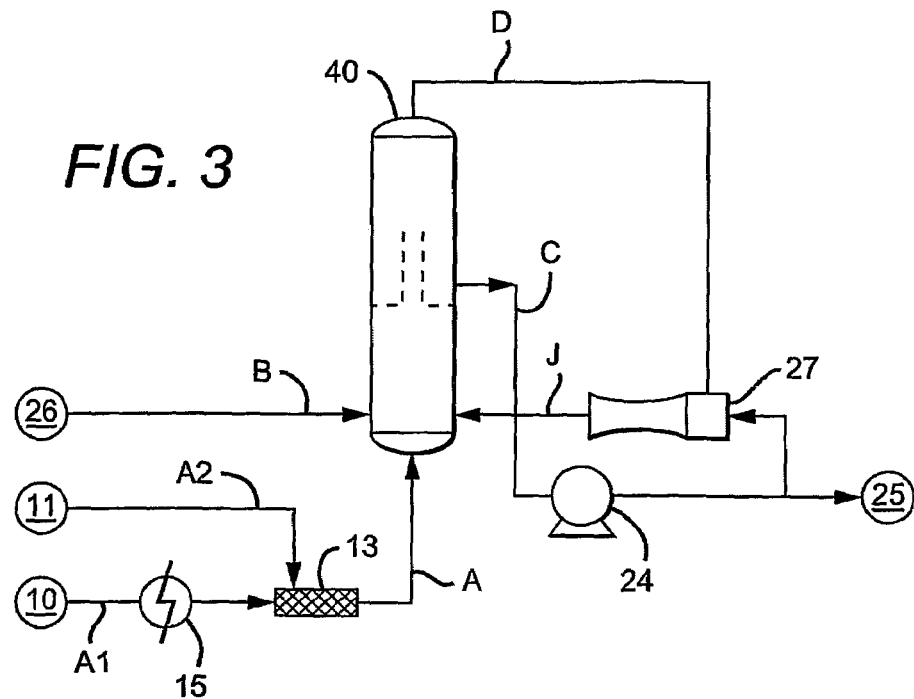
FIG. 3 is a schematic view of a second caustic recovery system embodying the invention.

One benefit of eliminating substantially all of the waste gasses is that there is no need to mix natural gas in the streams passing through tower 40. A second benefit is that there are no waste gasses to be disposed of. Any oxygen that has not yet been used to regenerate caustic can simply be compressed and put back into the tower to regenerate additional caustic. Alternative methods for oxygen recycle include caustic recirculation in combination with an eductor as shown in FIG. 3.

Although it is preferred that pure oxygen be supplied, it is contemplated that supplying a mixture comprising at least 30% oxygen would still be advantageous.

Figure 4:
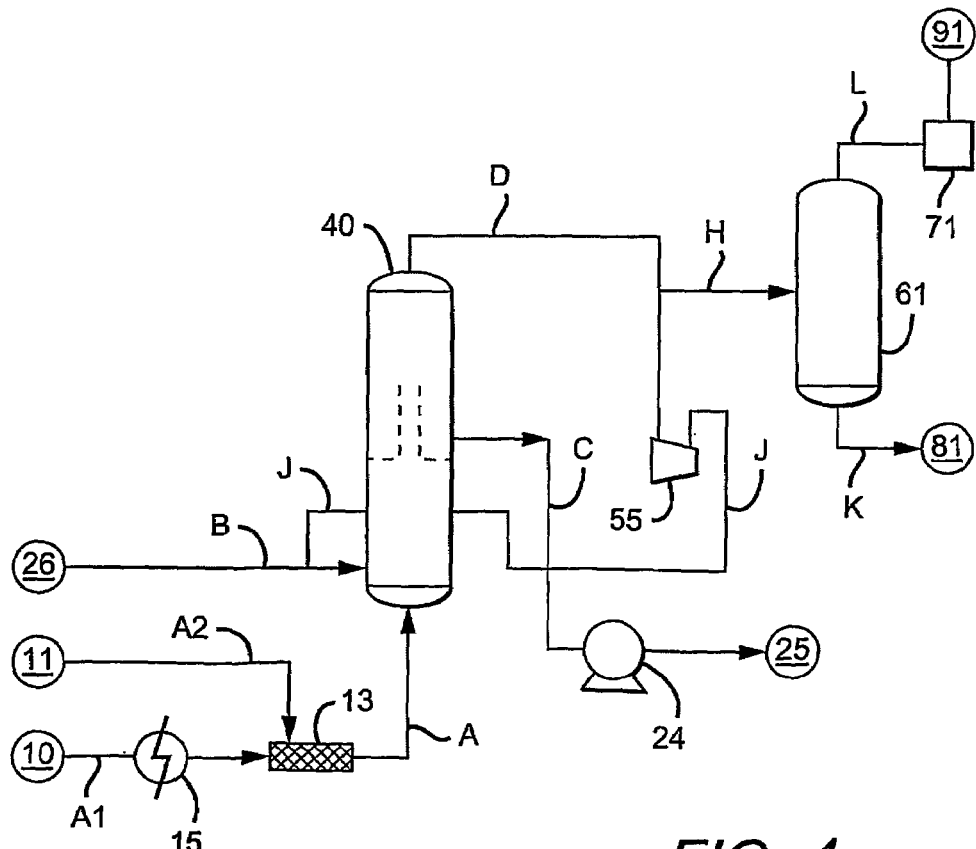
FIG. 4 is a schematic view of a third caustic recovery system embodying the invention.

If less than pure oxygen is used, other gasses may build up in the system and eventually have to be vented and treated in a manner similar to the venting and treatment of waste gasses now. However, the waste stream would be a factor of 10 to 1000 times smaller, would not require a caustic wash, and would be easier to dispose of. Commercially available oxygen typically comprises 88 to 99.5% oxygen, 12 to 0.5% nitrogen and trace components as an impurities. FIG. 4 illustrates the regeneration process when a small quantity of waste gas H is purged from the system. Purge gasses H are fed into KO drum 61 prior to disposal to the atmosphere 91. If required for environmental purposes, gasses L form KO drum 61 are passed through a downstream combustion device 71 prior to being vented to the atmosphere. Liquids K collected in the KO drum 61, are returned to the caustic system.

When using high purity oxygen, depending on regeneration system operating conditions, the nitrogen and trace impurities will not need to be purged from the vapor as the small quantities of these gasses will dissolve into the caustic solution and be purged from the system when recontacted with the process stream the regenerated caustic is used to treat.

Thus, specific embodiments and applications of caustic recovery systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A caustic recovery system comprising:
   an oxygen source that is fluidly coupled to an oxidizer tower and configured to provide oxygen to the oxidizer tower;
   a caustic source configured to provide spent caustic and an oxidation catalyst source configured to provide an oxidation catalyst;
   wherein the caustic source and the oxidation catalyst source are fluidly coupled to each other and the oxidizer tower via a mixing device, wherein the mixing device is configured to provide a mixture of spent caustic and oxidation catalyst to the oxidizer tower;
   wherein the oxidizer tower is configured to allow introduction of the mixture an oxygen recycle stream, and the oxygen at a lower portion of the tower to thereby provide co-current contact of the spent caustic and catalyst with the oxygen and the recycle stream and to so produce regenerated caustic,
   wherein the oxidizer tower further includes a recycling conduit that is configured to deliver the oxygen recycle stream from an upper vent opening of the oxidizer tower to a lower feed opening of the oxidizer tower, and
   wherein the oxygen recycle stream is substantially free of waste gases.

2. The system of claim 1 wherein substantially all of any gasses vented from the oxidizer tower are fed back into the tower as the oxygen recycle stream.

3. The system of claim 2 further comprising a compressor or eductor that is configured to deliver the oxygen recycle stream to the tower.

4. The system of claim 3 wherein the oxygen source is configured to provide the oxygen to the tower as a gas stream comprising at least 88% O2.

5. A method of regenerating caustic comprising:
   feeding into a lower portion of an oxidizer tower an oxygen recycle stream, an oxygen-containing stream, and a mixture of spent caustic and oxidation catalyst;
   co-currently contacting the mixture of spent caustic and oxidation catalyst with the oxygen recycle stream and the oxygen-containing stream to so produce regenerated caustic;
   withdrawing the regenerated caustic from the oxidizer tower; and
   recycling an oxygen recycle stream from an upper vent opening of the oxidizer tower to a lower feed opening of the oxidizer tower, wherein the oxygen recycle stream is substantially free of waste gases.

6. The method of claim 5 wherein the oxygen-containing stream comprises at least 88% oxygen O2.

7. The method of claim 5 wherein natural gas is not intermingled with the spent caustic and oxygen-containing stream in the oxidizer tower.

\* \* \* \* \*